UNITED STATES PATENT OFFICE.

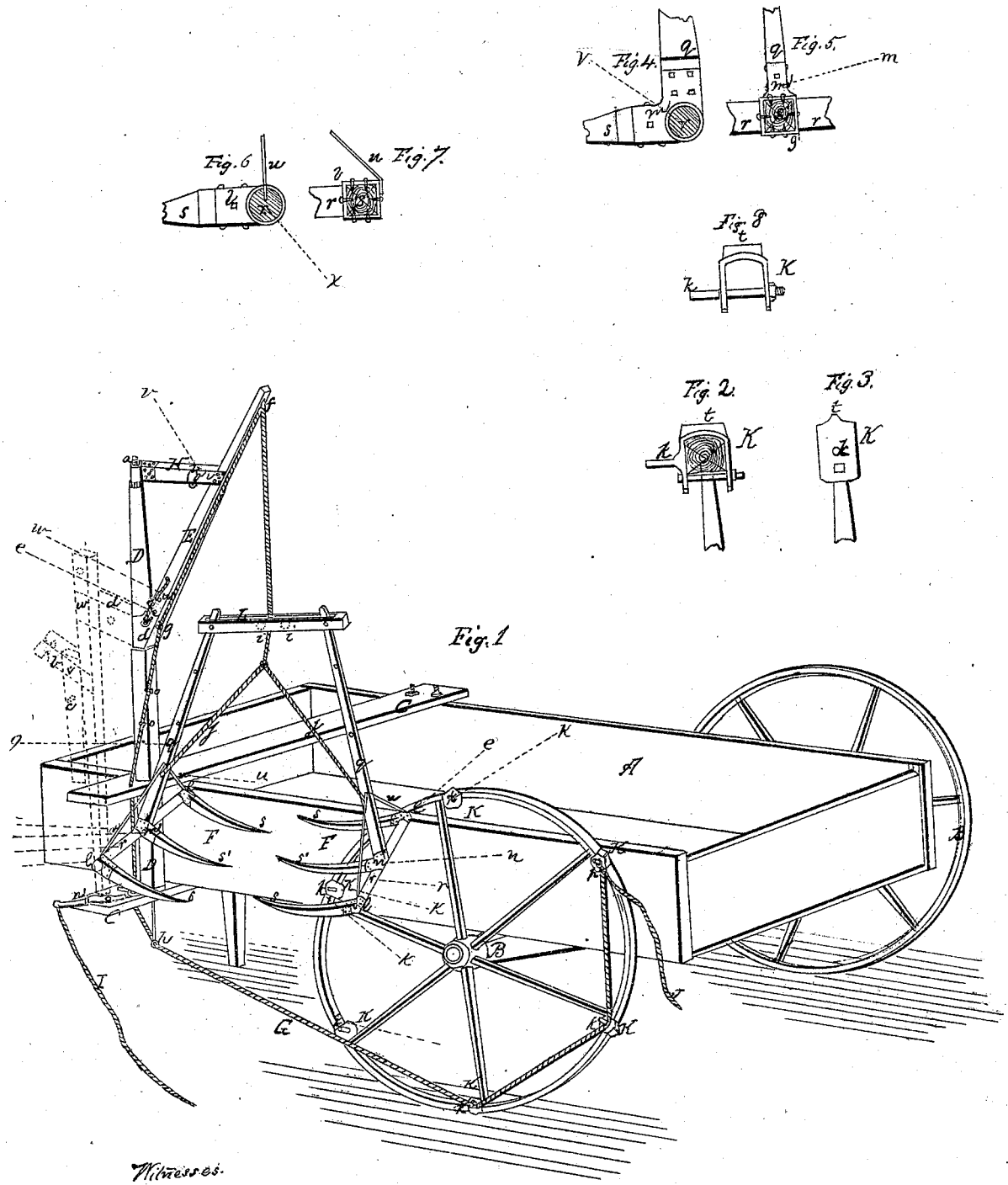

ABRAHAM W. LOZIER, OF NEW YORK, N. Y.

IMPROVEMENT IN HAY-LOADERS.

Specification forming part of Letters Patent No. 79,135, dated June 23, 1868.

*To all whom it may concern:*

Be it known that I, ABRAHAM W. LOZIER, of the city, county, and State of New York, have invented a new and useful Improvement in Hay-Loaders; and I do hereby declare the following to be a full, clear, and exact description thereof, reference being made to the drawings and the figures and letters of reference thereon accompanying this specification, and forming part of the same.

Figure 1 of the said drawings is a view in perspective of the hay-loading apparatus attached to a wagon. Figs. 2, 3, and 8 are detail drawings of the adjustable clevises. Figs. 4 and 5, 6 and 7, are sectional views of the fork-sockets.

Similar letters of reference indicate like parts in all the drawings.

Prior to the date of my invention many devices have been made and used for elevating and loading hay; but so far as I know their construction has been such as to require the employment of gearing, friction-pulleys, or analogous devices for raising the load from the ground, so that these machines were necessarily expensive and difficult to be obtained by farmers in many sections of the country, and were also liable to become deranged.

It is the object of my invention to obviate these difficulties by producing a simple, cheap, and efficient apparatus that can be readily attached to an ordinary hay cart or wagon, and be so operated from one of the wheels of the same that the hay may be gathered up and deposited on the wagon, one person being necessary to manipulate the forks and one to arrange the hay on the wagon.

To this end my invention consists, first, in the construction and arrangement of a series of clevises so that they may be applied to and combined with one of the wheels of the wagon to enable it to obtain the necessary tractive power to be used as a drum-wheel; second, in the combination and arrangement of a clevis or pin drum-wheel, as described, a derrick, and an elevating-fork.

To enable others skilled in the art to make and use my invention, I will describe its construction and operation.

B B represent the hind wheels of a hay-wagon, to one of which the clevises K K, &c., are secured. These clevises are firmly bolted to the fellies, and are cast of the proper form with the projections $t\ t$, &c., which enable the wheel to obtain the necessary purchase on the ground and with the pins K K, &c., around which the rope G is wound as the wheel revolves. These pins are on a line, or nearly so, with the axis of the wheel.

The forks F F are constructed mainly of wood, of sufficient strength to raise a large quantity of hay at a time, and yet light enough to be handled and managed readily. The socket-pieces used in the construction of the forks are shown in Figs. 4, 5, 6, and 7, the center ones, $m\ m$, being cast with three sockets for the reception of the handle $q$, bar $r$, and center tine, $s'$, and the end ones, $l\ l$, with two sockets for the bar $r$ and tines $s\ s$. The handles are pivoted to the cross-piece L and furnished with brace-irons $u\ u$.

The standard D of the derrick passes through a mortise in the upper board of the frame C, and its end is received in a socket in the lower board. These boards, constituting the frame, are bolted to the wagon-body A. The arm E of the derrick is pivoted at $w$ to the strap $d$, which turns on a collar on the standard D just above the square shoulder, and is prevented from dropping down by the pin $e$, which passes through the strap and the end of the arm. To this arm is attached another arm, H, hinged at $v$, and turning freely on a pivot in the end of the standard, and when this arm is in place the pin $c$ drops into the slots in the straps $b$, so that the strain is removed from the pivot $v'$, that would otherwise come upon it. The position of the several parts of the derrick when the same is not is use is plainly shown by the colored lines in the drawings.

The rope G, to which the forks are attached by the ropes $j\ j$, passes through the rollers $i\ i$, the pulleys $f\ g$, the catch $n$, and the pulley $h$, and is provided with hook $p$ on its end, by which to attach it to the wheel. The catch $n$, which controls the hoist-rope, is held back from contact with it by a spring, and is governed by the check-rope I. The knots $o'\ o'$ are placed upon the rope G for the purpose of enabling the catch $n$ to hold the rope securely, the upper one, $o'$, being too large to pass through the catch $n$, so that if the rope is not checked soon enough the strain will be taken from the derrick.

The frame having been bolted to the wagon-body and the clevises adjusted on the wheel the standard is fitted to its socket, the strap $d$ slipped to its place over the collar, the arm raised to its position and held by the pin $e$, and the arm H turned down and its end secured to the pivot $a$. The apparatus is then ready for use.

In order to employ the loader to advantage, the hay should be raked into cocks of a size to be readily seized by the forks. The wagon being driven now to one of these cocks, the attendant adjusts the forks over the same, and as the wagon is started forward he attaches the hook $p$ to one of the pins K, holding the ropes I and J in his hand as he walks along. The action of the wheel upon the rope G causes the load to be raised from the ground, and as the fork reaches the end of the arm the attendant prevents its further ascent by jerking the hook from its pin by the rope J, and at the same time holds the load in place by bringing into play the catch $n$. The projections $o\ o'$, where the catch acts on the rope, are prevented from slipping past the catch when the same is pressed against the rope, and the load is thereby held until the attendant on the wagon is ready to receive it. This manner of working the apparatus admits of its being used with expedition, for as soon as the rope G is released from the wheel the wagon can be driven in the direction of the next cock and while the load in the forks is being adjusted on the wagon.

By the substitution of a hook in place of the forks the apparatus can be used advantageously in loading corn, grain, &c.

I claim—

1. The detachable pin-clevises K K, &c., in combination with the wheel B, constructed, arranged, and operating substantially as and for the purposes described.

2. The combination and arrangement of the clevises, the derrick, and the elevating-forks, the whole constructed and operating as described, and for the purposes set forth.

ABRAHAM W. LOZIER.

Witnesses:
EDWARD E. OSBORN,
WILLIAM M. ANDERSON.